United States Patent
Ueda et al.

(10) Patent No.: US 6,515,394 B2
(45) Date of Patent: Feb. 4, 2003

(54) STACKED COIL ASSEMBLY FOR A STATOR

(75) Inventors: Toshiaki Ueda, Urizura-machi (JP); Takashi Yasuhara, Yotsukaido (JP); Yoshimi Mori, Mito (JP); Yasuhiko Kimura, Hitachinaka (JP); Yoshikazu Kadowaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/870,513

(22) Filed: Jun. 1, 2001

(65) Prior Publication Data

US 2002/0057031 A1 May 16, 2002

(30) Foreign Application Priority Data

Nov. 15, 2000 (JP) .......................... 2000-347587

(51) Int. Cl.[7] .............................. H02K 3/00; H02K 3/04
(52) U.S. Cl. ...................... 310/208; 310/179; 310/201; 310/202
(58) Field of Search ................ 310/208, 201, 310/200, 202, 216, 254, 260, 179, 184, 198

(56) References Cited

U.S. PATENT DOCUMENTS

| | | | | | |
|---|---|---|---|---|---|
| 4,346,320 A | * | 8/1982 | Davey | ..................... | 310/201 |
| 4,400,226 A | * | 8/1983 | Horrigan | ..................... | 156/56 |
| 5,196,752 A | * | 3/1993 | Palma | ..................... | 310/260 |
| 5,986,380 A | * | 11/1999 | Kaminski et al. | ........... | 310/270 |
| 6,424,071 B1 | * | 7/2002 | Oohashi et al. | ............. | 310/180 |
| 2001/0010442 A1 | * | 8/2001 | Yasuhara et al. | ........... | 310/201 |
| 2002/0057031 A1 | * | 5/2002 | Ueda et al. | ................. | 310/208 |

FOREIGN PATENT DOCUMENTS

JP 11-178259 2/1999

* cited by examiner

*Primary Examiner*—Nestor Ramirez
*Assistant Examiner*—Thanh Lam
(74) *Attorney, Agent, or Firm*—Dickstein Shapiro Morin & Oshinsky LLP (57) ABSTRACT

The present invention provides a coil assembly comprising at least two end coil pieces having a U-shaped end and an open end, the open end comprising a first end and a second end, the second end having a terminal length greater than the first end, and at least one middle coil piece is provided stacked between the end coil pieces having a U-shaped end and an open end, the open end comprising third ends having a terminal length equal to the first end, and at least two intermediate coil pieces each being separately stacked between the end coil piece and the intermediate coil piece having a U-shaped end and an open end, the open end comprising fourth ends having a terminal length shorter than the first and third ends with the first and third ends being connected to an adjacent fourth end.

12 Claims, 12 Drawing Sheets

STACKED COIL ASSEMBLY FOR A STATOR

FIELD OF THE INVENTION

The present invention relates to a stacked coil assembly for a stator, and more particularly, to a stator of an electric rotary machine.

DISCUSSION OF THE RELATED ART

Figure 21:
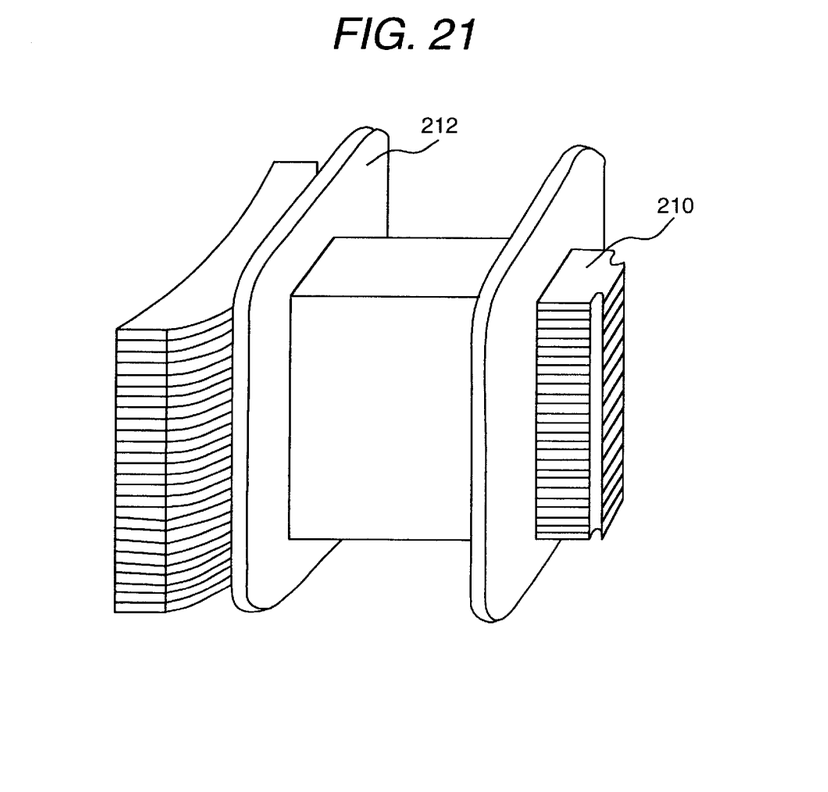
FIG. 21 illustrates a conventional coil assembly for a stator.

Conventionally, in a stator of an electric rotary machine, a concentrated winding system is utilized in which a coil is wound around a tooth portion of the stator by utilizing a bobbin. As shown in FIG. 21, a stator is comprised of a tooth portion 210 and a bobbin portion 212. A coil (not shown) is wound tightly on a bobbin 212. Next, the bobbin 212 with the winded coil is mounted on the tooth portion 210. Next, the tooth portion 210 having the bobbin 212 mounted thereon is combined together with a stator core to form the stator.

However, in the conventional method, coil is wound around the bobbin 212 very tightly causing excessively large winding tension. Thus, the bobbin 212 is frequently damaged and, in turn, the tooth portion 210 coupled to the bobbin 212 can be damaged as well. This results in an ineffective performance of the stator. Also, if the bobbin 212 is made thicker to protect it from breakage or damage, then the heat conducting property of the bobbin 212 is deteriorated, damaging the coil, due to the excessively high temperatures since cooling of the coil is hindered.

SUMMARY OF THE INVENTION

The present invention provides a stacked coil assembly for a stator of an electric rotary machine in which the performance of the stator is improved and the above discussed problems of the conventional art is avoided.

In an object of the present invention a coil assembly is provided comprising at least two end coil pieces having a U-shaped end and an open end, the open end comprising a first end and a second end, the second end having a terminal length greater than the first end. Further, at least one middle coil piece is provided stacked between the end coil pieces having a U-shaped end and an open end, the open end comprising third ends having a terminal length equal to the first end. Also, at least two intermediate coil pieces are provided, each being separately stacked between the end coil piece and the middle coil piece having a U-shaped end and an open end, the open end comprising fourth ends having a terminal length shorter than the first and third ends with the first and third ends being connected to an adjacent fourth end.

In another object of the present invention a coil assembly is provided comprising at least two end coil pieces having a U-shaped end and an open end, the open end comprising a first end and a second end, the second end having a terminal length greater than the first end. Further the invention provides at least one middle coil piece stacked between the end coil pieces having a U-shaped end and an open end, the open end comprising third ends having a terminal length equal to the first end. Also, at least two intermediate coil pieces are provided each being separately stacked between the end coil pieces and the middle coil piece having a U-shaped end and an open end, the open end comprising fourth ends having a terminal length shorter than the first and third ends wherein the ends of each of the respective coil pieces lie on a different plane with respect to each other and the first and third ends being connected to an adjacent the fourth end lying on the same plane.

In yet another object of the present invention a stator is provided comprising a core having an entry side and an exit side, a tooth portion having two contact sides provided in an inner periphery of the core, a slot provided in each of the contact sides and a coil assembly provided in the slot. The coil assembly further comprising at least two end coil pieces having a U-shaped end and an open end, the open end comprising a first end and a second end, the second end having a terminal length greater than the first end. Further, the invention provides at least one middle coil piece stacked between the end coil pieces having a U-shaped end and an open end, the open end comprising third ends having a terminal length equal to the first end and at least two intermediate coil pieces, each being separately stacked between the end coil piece and the middle coil piece having a U-shaped end and an open end, the open end comprising fourth ends having a terminal length shorter than the first and third ends with the first and third ends being connected to an adjacent fourth end.

In another object of the present invention a stator is provided comprising a core having an entry side and an exit side, a tooth portion having two contact sides provided in an inner periphery of the core, a slot provided in each of the contact sides and a coil assembly provided in the slot. The coil assembly further comprises at least two end coil pieces having a U-shaped end and an open end, the open end comprising a first end and a second end, the second end having a terminal length greater than the first end. Further, at least one middle coil piece is provided that is stacked between the end coil pieces having a U-shaped end and an open end, the open end comprising third ends having a terminal length equal to the first end. Further, at least two intermediate coil pieces are provided, each being separately stacked between the end coil piece and the middle coil piece is provided having a U-shaped end and an open end, the open end comprising fourth ends having a terminal length shorter than the first and third ends and wherein the ends of each of the respective coil pieces lie on a different plane with respect to each other and the first and third ends being connected to an adjacent the fourth end lying on the same the plane.

In another object of the present invention a method of fabricating a coil assembly is provided comprising the steps of providing at least two end coil pieces having a U-shaped end and an open end, the open end comprising a first end and a second end, the second end having a terminal length greater than the first end. The method further provides the step of providing at least one middle coil piece stacked between the end coil pieces having a U-shaped end and an open end, the open end comprising third ends having a terminal length equal to the first end. Further, the method provides the step of providing at least two intermediate coil pieces, each being separately stacked between the end coil piece and the middle coil piece having a U-shaped end and an open end, the open end comprising fourth ends having a terminal length shorter than the first and third ends and connecting the first and third ends to an adjacent fourth end.

In another object of the present invention a method of fabricating a coil assembly is provided comprising the steps of providing at least two end coil pieces having a U-shaped end and an open end, the open end comprising a first end and a second end, the second end having a terminal length greater than the first end. Further, the method provides the step of providing at least one middle coil piece stacked on the end coil piece having a U-shaped end and an open end, the open end comprising third ends having a terminal length equal to the first end. Further, the method provides the step of providing at least two intermediate coil pieces each being separately stacked between the end coil piece and the middle coil piece having a U-shaped end and an open end, the open end comprising fourth ends having a terminal length shorter than the first and third ends. The method further provides the step of connecting the first and third ends to an adjacent the fourth ends lying on the same the plane wherein the ends of each of the respective the coil pieces lie on a different plane with respect to each other.

In another object of the present invention a method of fabricating a stator is provided comprising the steps of providing a core having an entry side and an exit side, providing a tooth portion having two contact sides in an inner periphery of the core, providing a slot in each of the contact sides and providing a coil assembly in the slot. The step of providing a coil assembly further comprising the step of providing at least two end coil pieces having a U-shaped end and an open end, the open end comprising a first end and a second end, the second end having a terminal length greater than the first end. Further, the method provides providing at least one middle coil piece stacked between the end coil pieces having a U-shaped end and an open end, the open end comprising third ends having a terminal length equal to the first end. Further, the method provides the step of providing at least two intermediate coil pieces stacked between the end coil piece and the middle coil piece having a U-shaped end and an open end, the open end comprising fourth ends having a terminal length shorter than the first and third ends and connecting the first and third ends to an adjacent fourth end.

In yet another object of the present invention, a method of fabricating a stator is provided comprising the steps of providing a core having an entry side and an exit side, providing a tooth portion having two contact sides in an inner periphery of the core, providing a slot in each of the contact sides and providing a coil assembly in the slot. The step of providing a coil assembly further comprising the step of providing at least two end coil pieces having a U-shaped end and an open end, the open end comprising a first end and a second end, the second end having a terminal length greater than the first end. Further, the method provides the step of providing at least one middle coil piece stacked between the end coil pieces having a U-shaped end and an open end, the open end comprising third ends having a terminal length equal to the first end. The method further provides at least two intermediate coil pieces, each being separately stacked between the end coil piece and the middle coil piece having a U-shaped end and an open end, the open end comprising fourth ends having a terminal length shorter than the first and third ends. The method further provides the step of connecting the first and third ends to an adjacent fourth end lying on the same the plane wherein the ends of each of the respective the coil pieces lie on a different plane with respect to each other.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Exemplary embodiment of the present invention will be described below in connection with the drawings. Other embodiments may be utilized and structural or logical changes may be made without departing from the spirit or scope of the present invention. Although the present invention is described with respect to a stator, the invention is not limited to it. For instance, the present invention can be used in any electric rotary machine. Like items are referred to by like reference numerals throughout the drawings.

Figure 1:
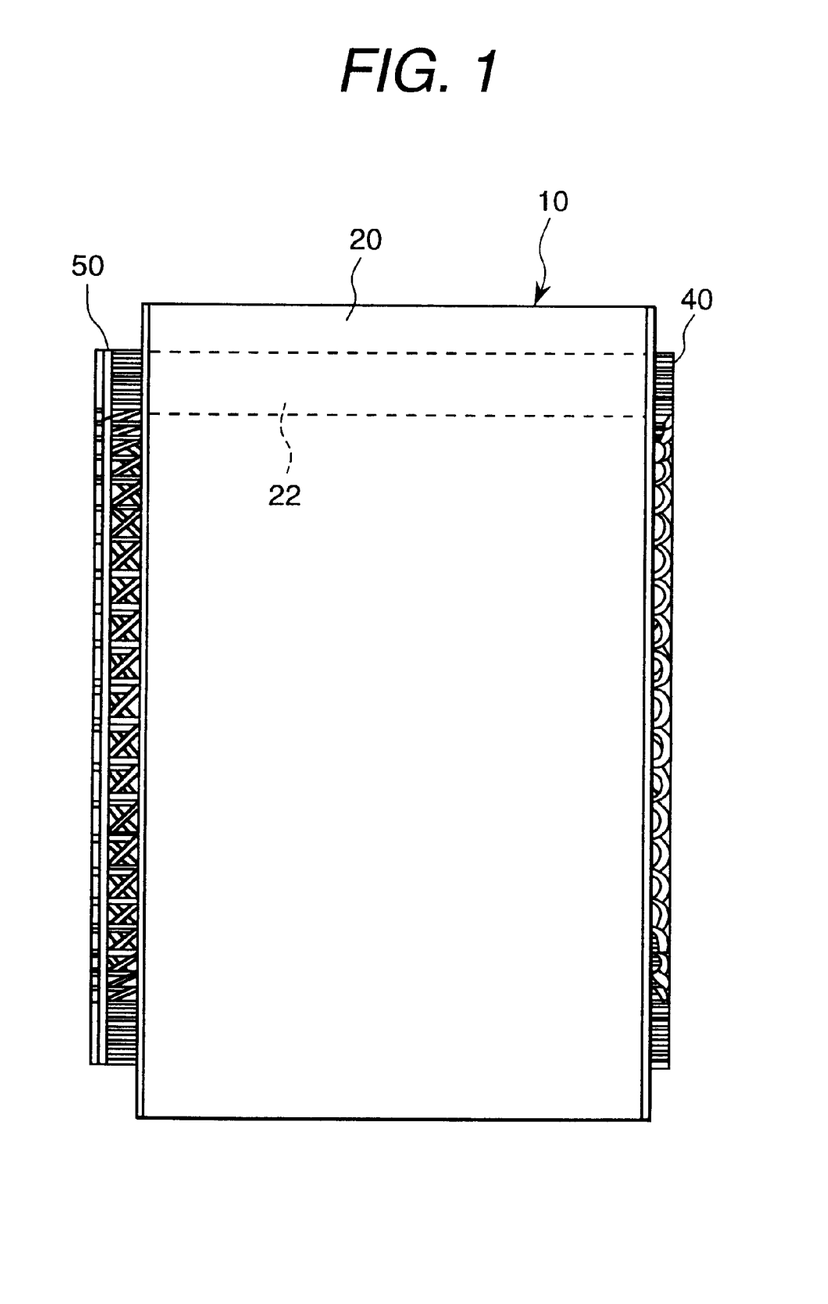
FIG. 1 is a diagram showing a front view of the stator according to an embodiment of the present invention.

Referring now to the drawings, FIG. 1 is a diagram showing a front view of the stator according to an embodiment of the present invention. A stator 10 is composed of a stator iron core 20, a coil 40, and a connecting ring 50. As will be described with reference to FIGS. 2 and 4, the coil 40 is composed of U-shaped shape coil pieces stacked on one another. The coil assembly is inserted into a slot 22 provided in the stator iron core 20 from the right side of the figure. The end portions opposite the U-shaped portion of the of the coil assembly 40 are bent so that the end portions of the adjacent coil pieces are brought into contact with each other, whereby the coil pieces are formed into a coil assembly having a predetermined number of windings. Also, a pair of ends of the end coil pieces constituting the coil assembly 40 are connected to the connecting ring 50 so that the three-phase terminals (U-phase, V-phase, W-phase) form a Y-connection.

Figure 2:
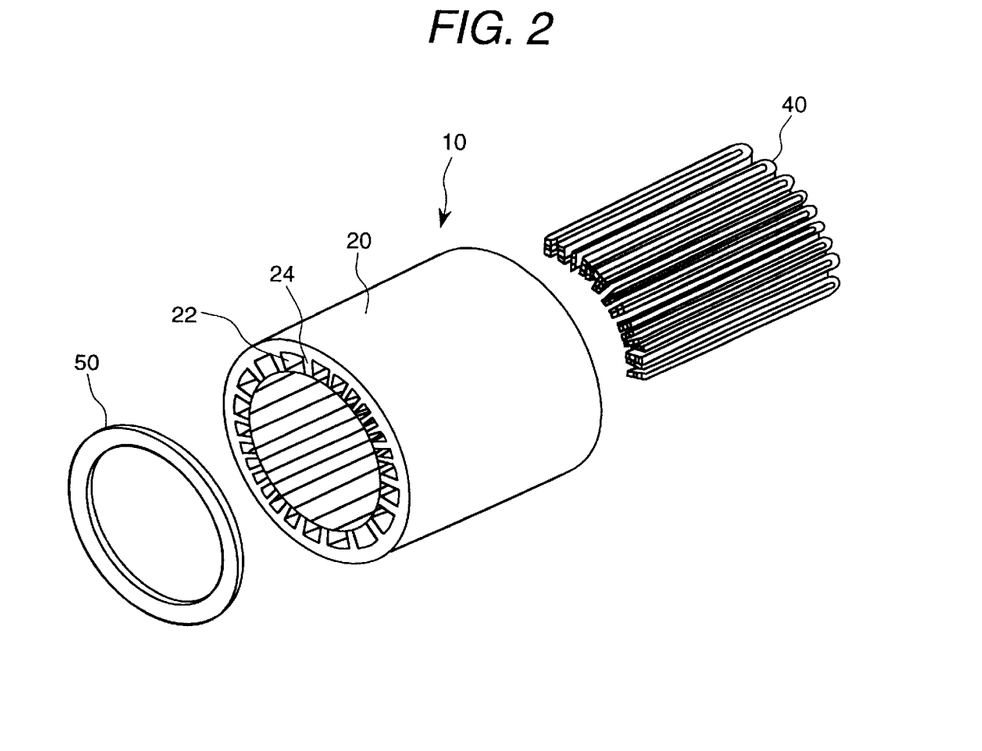
FIG. 2 is a perspective view of the stator according to an embodiment of the present invention.

FIG. 2 is a perspective view of the stator according to an embodiment of the present invention. The stator iron core 20 has a plurality of tooth portions 24 each extending from the annular shape core back portion in the internal direction thereof. In other words, the tooth portion 24 is provided in an inner periphery of the core 20. A slot 22 is formed between a pair of tooth portions 24 adjacent to each other. In other words, the tooth portion 24 has two contact sides and a slot 22 is provided in each of the sides. The stator iron core 20 is formed in such a manner that a thin plate member is punched so as to integrally form the core back portion and the tooth portions, and then the thin plate members are stacked on one another.

The stator coil assembly 40 is bending into a coil piece of a U-shape in advance. Thereafter, the coil pieces are stacked on each other and the ends of the coil pieces are inserted into each of the plural number of slots 22 provided in the stator iron core 20 so that the pair of straight portions of the coil piece are is inserted into the slots adjacent to each other with the stator tooth portion 24 envelopesed by the pair of straight portions of the coil piece. After the stator coil assembly 40 is inserted into the slots 22, the end portions of the inserted side (i.e., the end portions opposite to the U-shaped portion) of the coil pieces constituting the coil assembly 40 are bent in an alternate fashion, as will be described in detail below, so that the adjacent coil pieces are connected to each other. In this way, the coil assembly is formed into a coil assembly having a predetermined number of windings. Furthermore, in order to make all of the coil assemblies into a connection circuit having a predetermined arrangement, for example, the connecting ring 50 having a crossover serving as a neutral point formed in advance is connected to both the ends of the winding portion of each coil assembly 40 so that the three-phase (U-phase, V-phase, W-phase) terminals constitute a Y-connection. In this way, the stator 10 having stator coil assemblies connected in a desired manner is completed.

Figure 3:
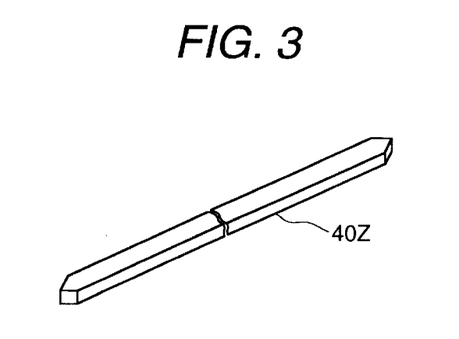
FIG. 3 illustrates a coil piece utilized in the present invention.

As shown in FIG. 3, the stator coil assembly 40 is manufactured by using wire 40Z on which an insulation coating is provided. The wire is cut into pieces, each of which has a predetermined length. When the pieces undergo the cutting process, both the ends thereof are cut in a slant direction. Both the ends are cut in the slant direction, because connection of one piece to another becomes easy and reliable when both the ends are connected to one another (e.g., by means of TIG welding) for forming a coil assembly of the winding style. Thereafter, the cut piece is formed into a U-shaped shape stator coil piece 40Y by using a forming jig, as shown in FIG. 4.

Figure 4:
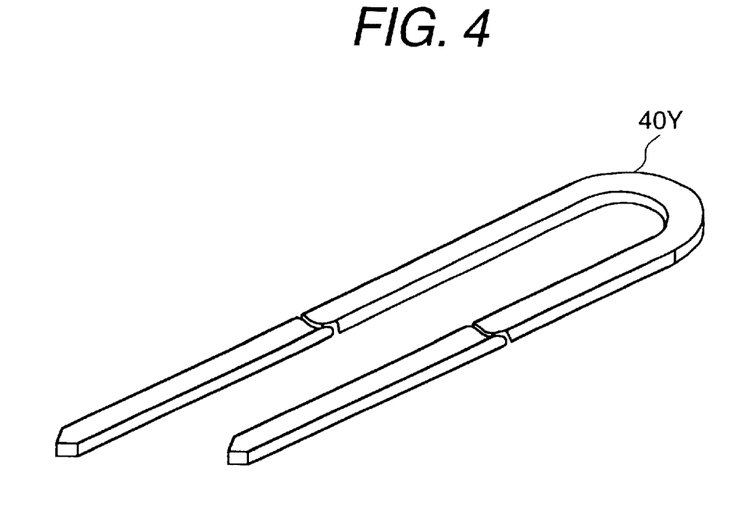
FIG. 4 illustrates a coil piece utilized in the present invention.
Figure 5:
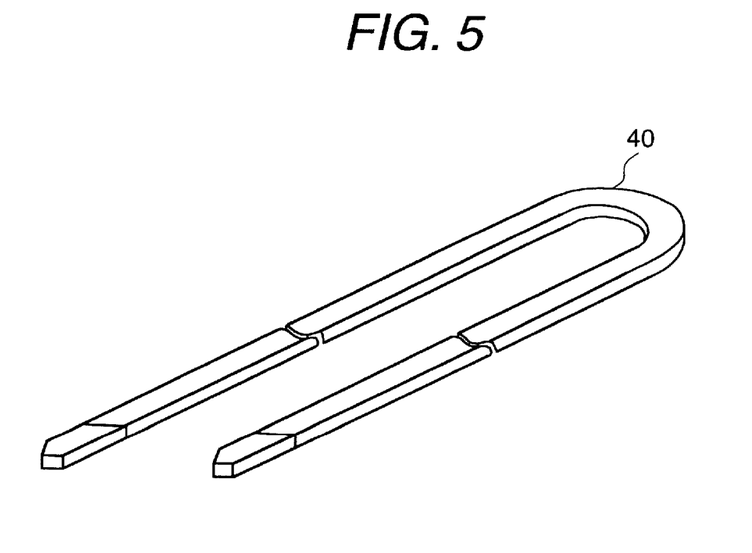
FIG. 5 illustrates a coil piece utilized in the present invention.

Furthermore, as shown in FIG. 5, the insulation coating is removed at both ends of the stator coil piece 40Y shown in FIG. 4 so as to make the piece suitable for the stator coil assembly 40. The insulation coating is removed at the both ends of the stator coil piece so that bonding property upon connecting the ends thereof to one another becomes stable.

Figure 6A:
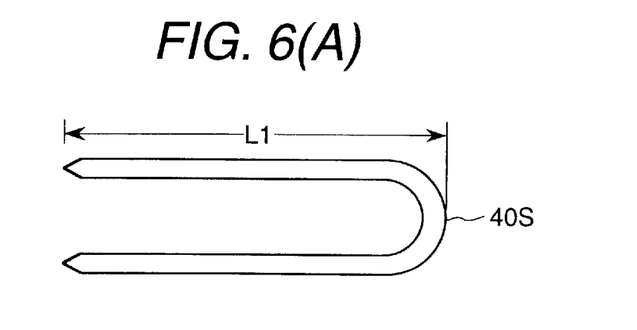
FIGS. 6(A)–(C) illustrate the stator coil pieces utilized in the stator according to an embodiment of the present invention.
Figure 6B:
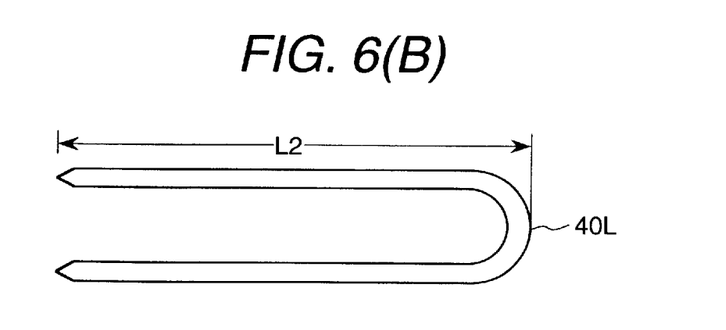
Figure 6C:
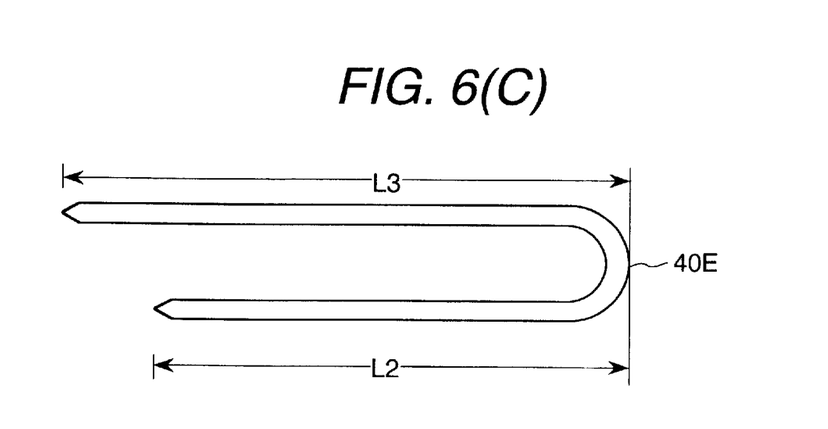

FIGS. 6(A)–(C) illustrates the stator coil pieces utilized in the stator according to an embodiment of the present invention. According to the process of present embodiment shown in FIGS. 3 to 5, three types of stator coil pieces 40S, 40L, and 40E are formed as shown in FIGS. 6A to 6C. A intermediate coil piece 40S shown in FIG. 6A is a coil piece of which whole length is L1. The length L1 is slightly longer than the whole length of the stator core.

A long coil piece 40L ("middle coil piece") shown in FIG. 6B is a coil piece of which whole length is L2. The length L2 of the middle coil piece 40L is longer than the whole length of the short coil piece 40S ("intermediate coil piece") by several millimeters. As will be described with reference to FIG. 10, the end portion of the middle coil piece 40L is bent so that the end portion thereof is brought into contact with the end portion of the intermediate coil piece 40S. In other words, the end portion of the coil pieces are bent towards an adjacent end portion to create a connection. Some of the end portions are bent towards another end portion which lies on a different plane from each other. For example, if the width of the tooth portion to which the coil assembly 40 is engaged is set to 10 mm, and the bending angle of the end portion is 45°, the length difference (L2−L1) is about 4 mm.

An end coil piece 40E shown in FIG. 6C is a coil piece of which one side length of its U-shaped shape is L2 and of which the other side length of the same is L3. The end portion of the coil piece 40E of which has a length L3 is utilized for connection to the connecting ring 50. The length difference (L3−L2) is about several millimeters.

Figure 7:
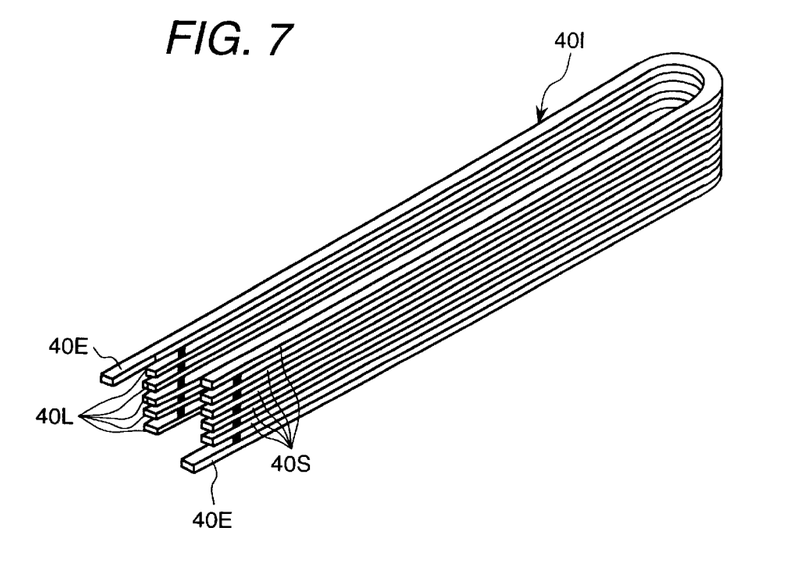
FIG. 7 illustrates a stacked style stator coil assembly utilized in the stator according to an embodiment of the present invention.

FIG. 7 illustrates a stacked style stator coil assembly utilized in the stator according to the first embodiment of the present invention. According to the present embodiment, in order to form a predetermined number of winding numbers, as shown in FIG. 7, a plurality of stator coil pieces 40S, 40L, 40E are stacked on one another to form the stacked style stator coil assembly 40I. The stacked style stator coil assembly 40I is made up with at least two pieces of end coil piece 40E, n-pieces of middle coil piece 40L, and (n+1) pieces of intermediate coil pieces 40S. If n-pieces of middle coil piece 40L and (n+1) pieces of intermediate coil piece 40S are alternately stacked on one another, since the number of the intermediate coil piece 40S is larger than the number of the middle coil pieces 40L by one, the intermediate coil piece 40S are placed at an outer periphery of the middle coil piece 40L. Then, the end coil pieces 40E are stacked at both the end of the assembly to form the stacked stator coil assembly 40I.

After stacking the three types of coil pieces 40S, 40L, and 40E on one another, the insulation coating is removed except for a portion which will be inserted into the slot. In other words, the insulation coating at the contact ends are removed. Then, adjacent pieces are fixed to one another. Thus, the stacked stator coil assembly 40I is as an integral body. The coil assembly may be inserted into the stator slot in a stacked state with adjacent pieces not connected to one another and then connected after the insertion. Alternatively, each of the three types of stator coil pieces 40S, 40L, 40E may be inserted into the stator slot one by one so that the pieces are stacked on one another inside of the stator slot and then connection can be made.

Figure 8:
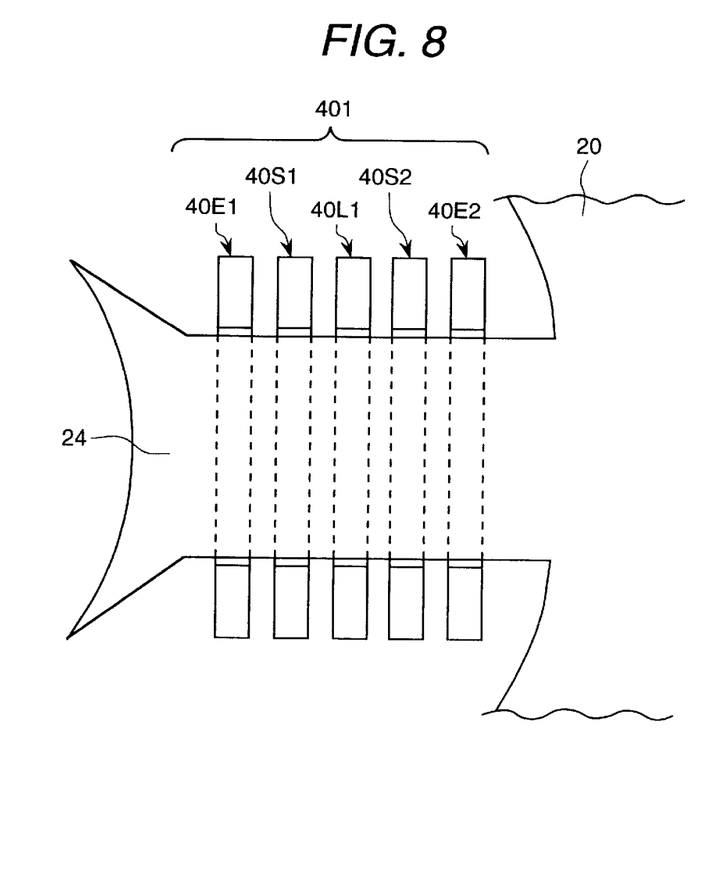
FIG. 8 illustrates the alignment of the stator coil assembly utilized in the stator according to an embodiment of the present invention.
Figure 9:
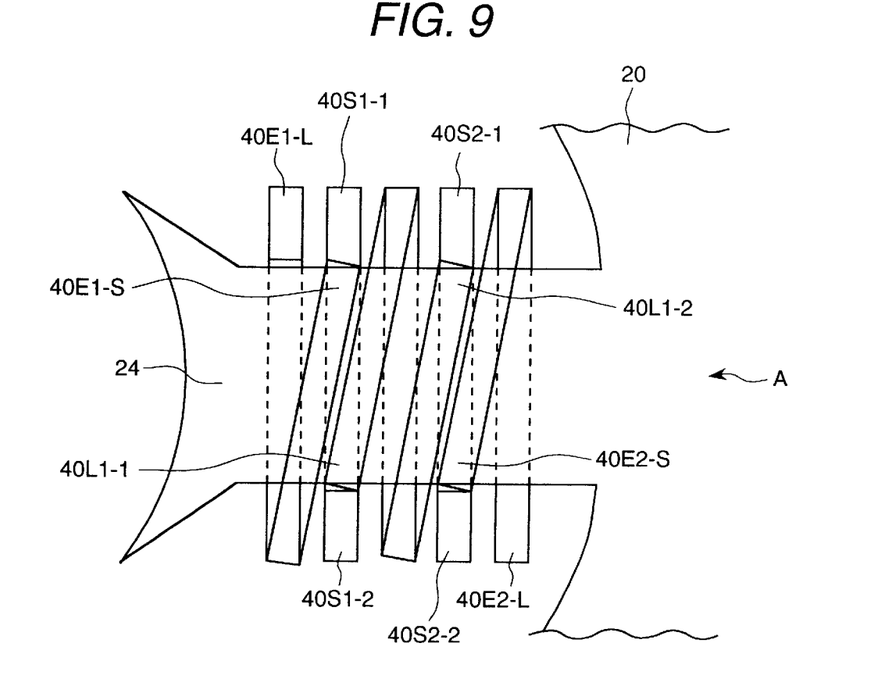
FIG. 9 illustrates the connection of the respective stator coil assembly utilized in the stator according to an embodiment of the present invention.

FIGS. 8 and 9 are diagrams illustrative of the method of forming the winding stator coil assembly employed in the stator according to the first embodiment of the present invention. In each of the diagrams, a partly enlarged side view is shown so that reference is made on a state upon forming the stator coil which is employed in the stator according to an embodiment of the present invention.

FIGS. 8 and 9 show a state as viewed from the side opposite to the U-shaped side portion of the stator coil assembly 40I in which the stacked style stator coil assembly 40I is inserted into the slot so that each of the coil pieces envelopes the stator tooth portion 24 of the stator core 20. In this case, for ease of explanation, the stacked style stator coil assembly 40I is composed of two pieces of end coil piece 40E1 and 40E2, one piece of middle coil piece 40L1, and two pieces of intermediate coil pieces 40S1 and 40S2, stacked on one another. Furthermore, although in the state shown in FIGS. 8 and 9 there is a gap between each of the stator coil pieces 40E1, 40E2, 40L1, 40S1, and 40S2, these coil pieces are stacked so that they are in contact with one another.

As shown in FIGS. 8 & 9, the middle coil piece 40L1 is stacked so as to be enveloped between the two intermediate coil pieces 40S1 and 40S2. Further, the end coil pieces 40E1 and 40E2 are stacked on both the end sides of the assembly. In this case, the end portions opposite the U-shaped side of the intermediate coil piece 40S1 are denoted as 40S1-1 and 40S1-2, respectively. The end portions opposite the U-shaped bent side of the intermediate coil piece 40S2 are denoted as 40S2-1 and 40S2-2, respectively. Further, the end portions opposite the U-shaped side of the middle coil piece 40L1 are denoted as 40L1-1 and 40L1-2, respectively. Furthermore, as shown in FIG. 6C, the end coil piece 40E1 has a longer-side end portion and a shorter-side end portion on the opposite side of the U-shaped end. In other words, the end coil pieces has two ends, one end having a longer terminal length than the other. Then, the longer-side end portion is denoted as 40E1-L while the shorter-side end portion is denoted as 40E1-S. Also, the longer-side end portion at the opposite side of the U-shaped end of the end coil piece 40E2 is denoted as 40E2-L while the shorter-side end portion of the same is denoted as 40E2-S.

As described with reference to FIGS. 6A and 6B, the middle coil piece 40L is longer than the intermediate coil piece 40S. Therefore, as shown in FIG. 9, one end portion 40L1-1 of the middle coil piece 40L1 is bent toward the end portion 40S1-2 of the intermediate coil piece 40S1 so that both of the end portions are brought into contact with each other. Also, the other end portion 40L1-2 of the middle coil piece 40L1 is bent toward the end portion 40S2-1 of the intermediate coil piece 40S2 so that both of the end portions are brought into contact with each other.

Further, as described with reference to FIGS. 6B and 6C, the length of the end portion of the shorter side of the end coil piece 40E1 is equal to the length L2 of the middle coil piece 40L1. Thus, the end portion 40E1-S of the shorter side of the end coil piece 40E1 is bent toward the end portion 40S1-1 of the intermediate coil piece 40S1 so that both of the end portions are brought into contact with each other. Also, the other end portion 40E2-S of the shorter side of the end coil piece 40E2 is bent toward the end portion 40S2-2 of the intermediate coil piece 40S2 so that both of the end portions are brought into contact with each other.

In this way, the end portion 40L1-1 and the end portion 40S1-2 are connected to each other by welding or the like. Similarly, the end portions 40L1-2 and 40S2-1, the end portions 40E1-S and 40S1-1, and the end portions 40E2-S and 40S2-2 are connected to each other by welding or the like. Note, in this embodiment, each of the ends of the respective coil pieces lie on the same plane when viewed from the perspective as shown in FIG. 8. For example, 40S1-1 is in the same plane as 40S21-2. Hence, when the connection to an end of an adjacent coil piece is made, the connection is made by bending the respective end lying on a different plane.

Figure 10:
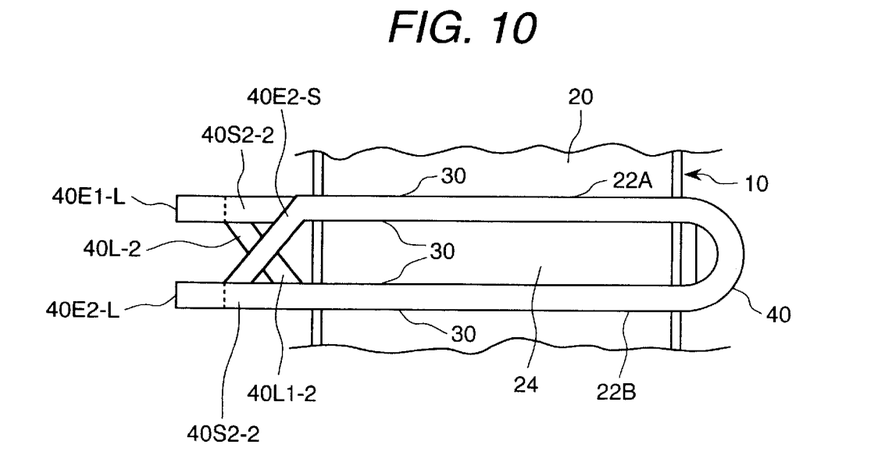
FIG. 10 illustrates a side-sectional view of the stator coil assembly utilized in the stator according to an embodiment of the present invention.

FIG. 10 is a cross-sectional view of the stator 10 taken a middle the axial direction at the slot portion 22. As shown in FIG. 10, the stator coil assembly 40 is inserted into a pair of slots 22A and 22B adjacent to each other so that an insulation material 30 is interposed between the slot and the coil assembly and the pair of straight portions of the coil assembly envelopes the stator tooth portion 24. The end portions opposite to the U-shaped portion of the stator coil assembly 40 are alternately bent and connected to one another, as described above, whereby the stator coil assembly of the present invention is formed into an integrally wound closed coil circuit.

The shorter end portion 40E2-S of the end coil piece 40E2 is bent toward the another end potion 40S2-2 of the intermediate coil piece 40S2 and brought into contact with each other, and thereafter they are welded and fixed together. Also, the other end portion 40L1-2 of the middle coil piece 40L1 is bent toward one end potion 40S2-1 of the intermediate coil piece 4OS2 and brought into contact with each other, and thereafter they are welded and fixed together.

The longer end portions 40E1-L and 40E2-L of the end coil pieces 40E1 and 40E2 are made longer than the welding portion so that the longer ends project from the welding portion. These end portions serve as a starting end and terminating end of the wound coil. Thus, as will be described later on, these end portions are utilized for connecting the coil assembly to the connecting ring 60.

Figure 11:
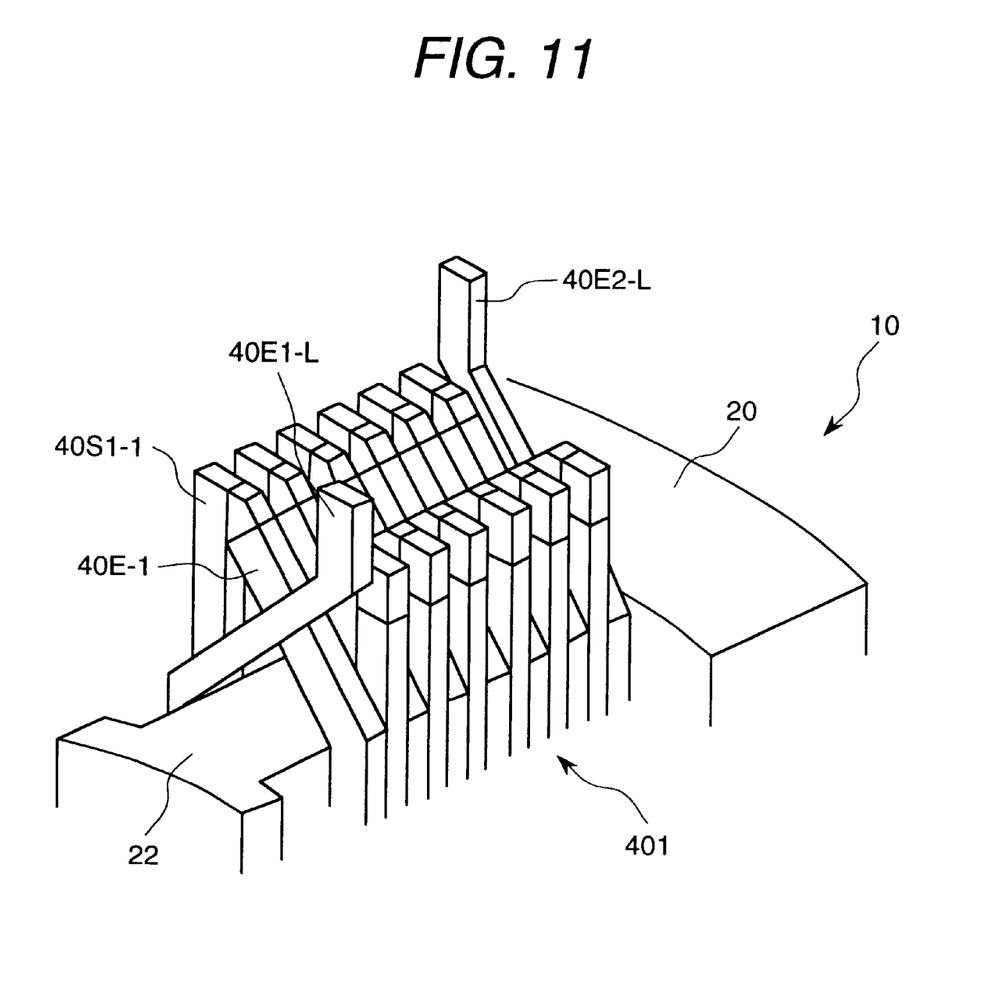
FIG. 11 illustrates an exploded view of the stator coil assembly employed in the stator according to the first embodiment of the present invention.

FIG. 11 is a diagram showing the stacked stator coil assembly 40I in which 11 pieces of coil pieces, i.e., two pieces of end stator coil pieces 40E1 and 40E2, four pieces of middle coil pieces 40L, and five pieces of intermediate coil pieces 40S, are stacked on one another, and the end portions thereof are weld to be connected to one another, whereby a coil assembly having windings is formed. Although in the illustration the longer end portions 40E1-L and 40E2-L of the end coil pieces 40E1 and 40E2 are also bent, this is merely for facilitating connection to the connecting ring. Therefore, as shown in FIG. 10, the end portions 40E1-L and 40E2-L may be left unbent depending on the shape of the connecting ring.

As shown in FIG. 9, points at which the welding is effected is arranged as follows. That is, for example, between the welding point at the end portions 40L1-1 and 40S1-2 and the welding point at the end portions 40E1-S and 40S1-1, there is interposed the bent end portion 40L1-2. Therefore, even if each of the coil pieces is contacted to one another, there is formed a gap of one coil piece amount between the points at which welding for fixation is effected. Accordingly, it is easier to prevent the welding portions from being contacted to each other and to avoid intermediate-circuit, and hence insulation performance will be improved. That is, on the open end portion opposite the U-shaped side of the stacked coil assembly 40, the welding portions are formed with a gap of one coil piece interposed between every adjacent coil pieces so that the bent coil piece portions become free from interference.

Figure 12:
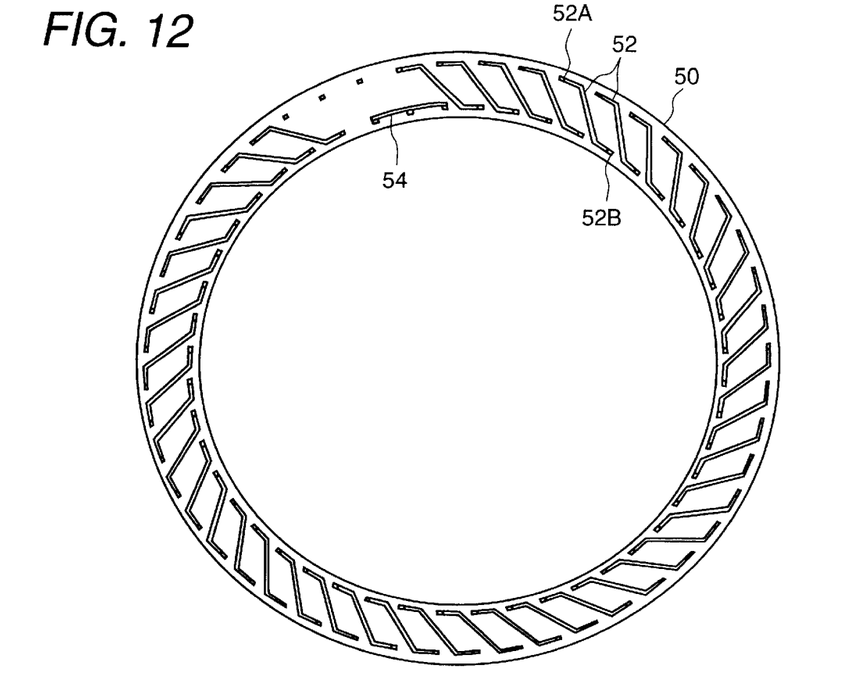
FIG. 12 is a plan view showing the arrangement of the connecting ring utilized in the stator according to an embodiment of the present invention.

FIG. 12 is a plan view showing the arrangement of the connecting ring employed in the stator according to an embodiment of the present invention. The connecting ring 50 will be described on an arrangement in which the three phase terminals are connected in a Y-connection manner. The connecting ring 50 has a crossover 52 attached thereon. The crossover 52 has at both the ends thereof openings 52A and 52B. The openings 52A, 52B are connected with the end portions 40E1-L and 40E2-L of the stacked coil assembly 40 at every three slots. Thus, U-phase, V-phase and W-phase are formed. A neutral line 54 is formed such that the crossover 52 is connected with an end portion corresponding to the terminal end of the winding stacked coil assembly. The crossover 52 and the neutral line 54 are formed in such a manner that when heat resisting resin undergoes insert-molding, the crossover and the neutral line are formed together with the connecting ring 50. The connecting ring 50 is connected to the stator coil assembly 40. Thus, the stator 10 having a desired connection is completed.

Hence, the present invention provides a coil assembly comprising at least two end coil pieces having a U-shaped end and an open end, the open end comprising a first end and a second end, the second end having a terminal length greater than the first end. Further, at least one middle coil piece is provided stacked between the end coil pieces having a U-shaped end and an open end, the open end comprising third ends having a terminal length equal to the first end. Also, at least two intermediate coil pieces are provided, each being separately stacked between the end coil piece and the middle coil piece having a U-shaped end and an open end, the open end comprising fourth ends having a terminal length shorter than the first and third ends with the first and third ends being connected to an adjacent fourth end.

Figure 13:
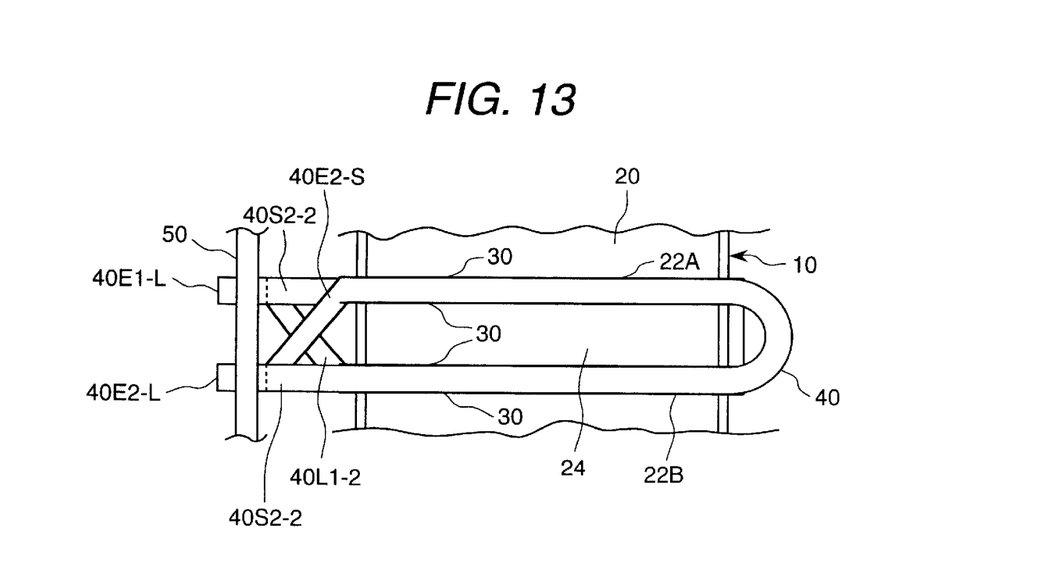
FIG. 13 illustrates the connection between the stator coil assembly and the connecting ring in the stator according to an embodiment of the present invention.

FIG. 13 is a diagram showing the connection state between the stator coil assembly and the connecting ring in the stator according to the first embodiment of the present invention. When the coil assembly is formed as shown in FIGS. 8 to 10, the longer ends 40E1-L and 40E2-L of the end coil pieces 40E1 and 40E2 serve as a starting end and a terminating end of the winding coil assembly. Thus, these end portions are inserted into the openings 52A and 52B of the crossover 52 of the connecting ring 50 shown in FIG. 12. In this way, the coil assembly is connected and fixed to the connecting ring 50.

As described above, according to the present embodiment, the U-shaped coil pieces are stacked in advance to construct the U-shaped coil assembly, and the coil assembly is inserted into a pair of slots adjacent to each other so that the straight portions of the coil assembly envelopes the tooth portion of the stator. Then, the end portions of the U-shaped coil pieces are brought into connection to the end portions of the adjacent U-shaped shaped coil pieces so as to obtain a predetermined winding number.

Figures 14A, 14B:
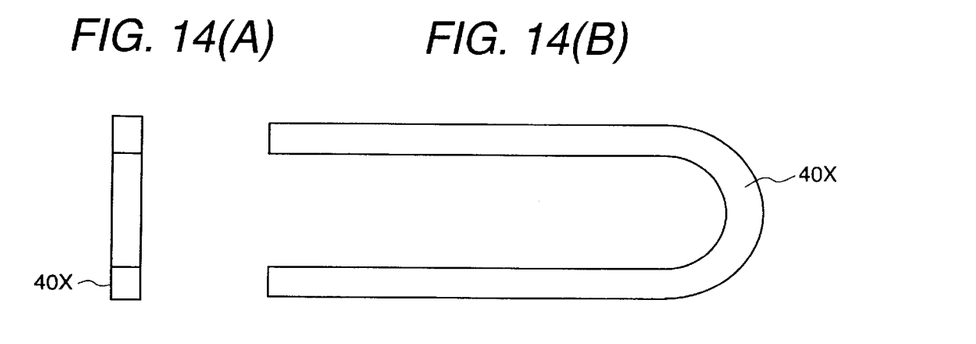
FIGS. 14(a)–(b) illustrates a stator coil piece utilized in the according to an embodiment of the present invention.
Figures 15A, 15B:
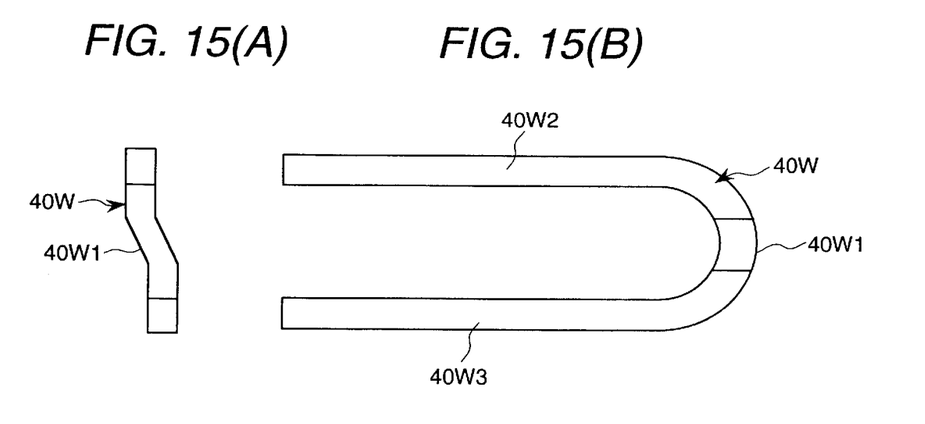
FIGS. 15(A)–(B) illustrates a stator coil piece utilized in the stator according to another embodiment of the present invention.

FIGS. 14 and 15 are a plan view and a side view illustrating the arrangement of the stator coil piece employed in the stator of the electric rotary machine according to another embodiment of the present invention. FIG. 14A is a side view of the stator coil piece before bending as described above with reference to FIGS. 1–13. As shown in FIG. 14B, a stator coil piece 40X before bending according to an embodiment as described above. Although not described in detail here, both the ends of the stator coil piece 40X are bent, and the insulation coating is removed at each of the end portions.

Referring now to FIGS. 15A, 15B, the stator coil piece 40W is formed to have a bending portion 40W1. The bending portion 40W1 is provided at the center portion of the U-shaped side of the U-shaped stator coil piece 40W. Thus, the pair of straight portions 40W2 and 40W3, which extend in parallel to each other, of the stator coil piece 40W are stepped with respect to each other. In other words, each of the ends of the respective coil pieces lie on a different plane with respect to one another.

Figure 16:
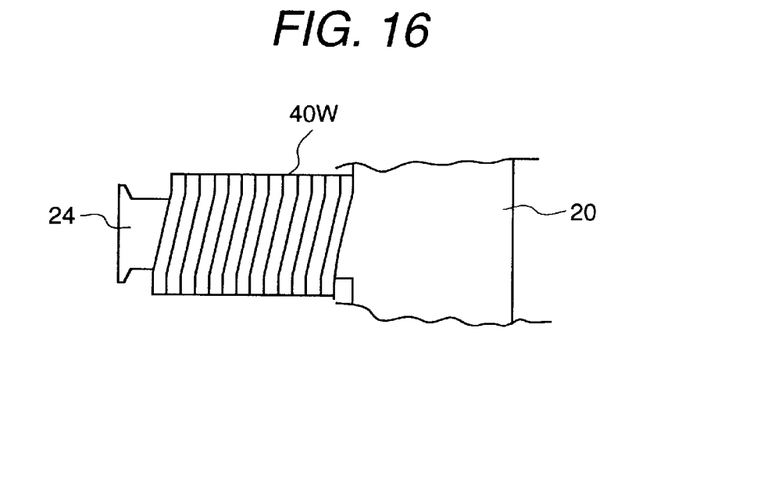
FIG. 16 illustrates a stator according to another embodiment of the present invention.

FIG. 16 illustrates a stator according to another embodiment of the present invention. As shown in FIG. 16, a plurality of stator coil pieces 40W having undergone bending shown in FIG. 15 are stacked on one another, and the stacked assembly is inserted into the stator slot portion so that the pair of straight portions of the coil assembly envelopes the stator tooth portion of the stator core 20.

Figure 17:
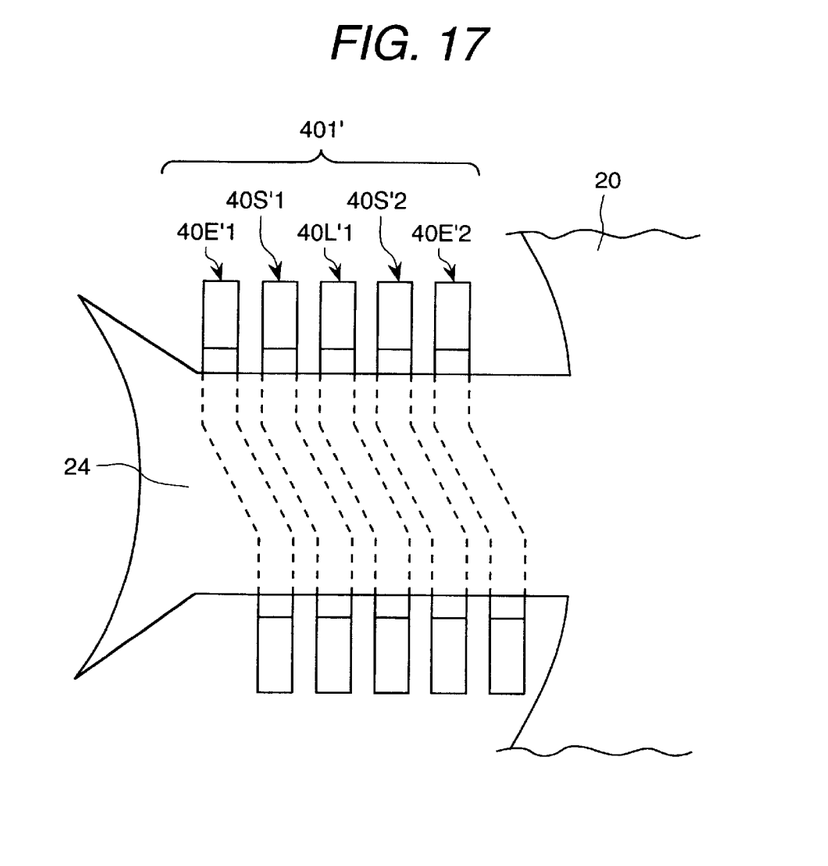
FIG. 17 illustrates the alignment of the stator coil assembly utilized in the stator according to another embodiment of the present invention.
Figure 18:
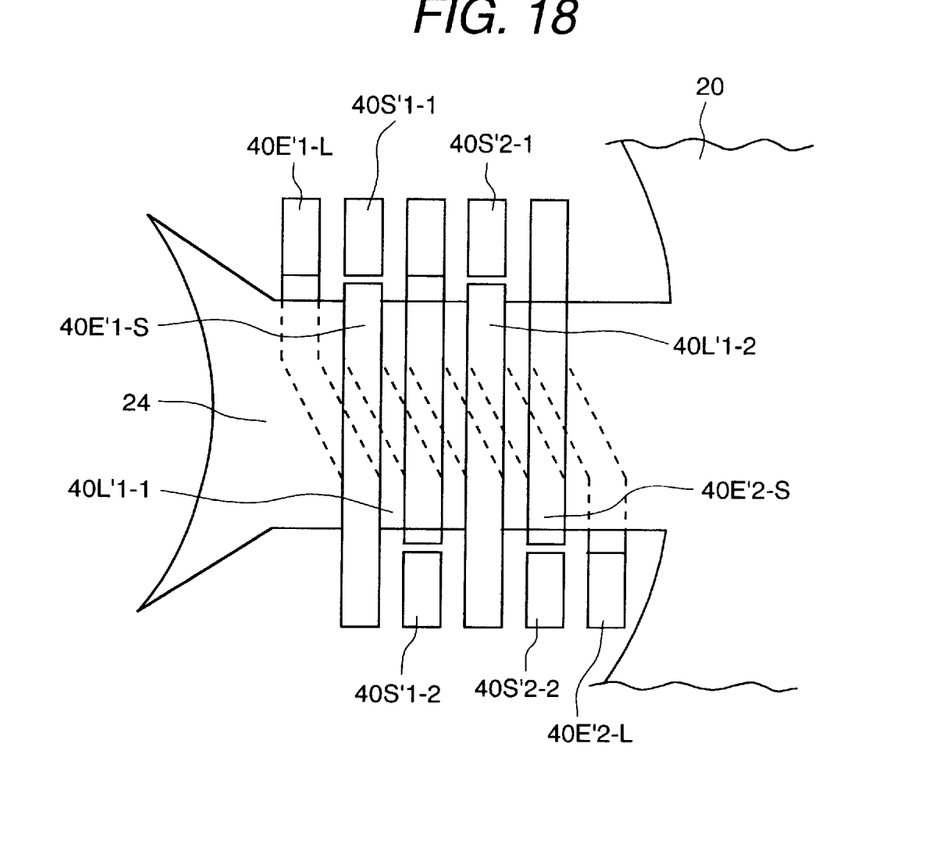
FIG. 18 illustrates the connection of the respective stator coil assembly utilized in the stator according to another embodiment of the present invention.

FIGS. 17 and 18 show a state as viewed from the side opposite the U-shaped side portion of the stator coil assembly 40I' in which the stacked style stator coil assembly 40I' is inserted into the slot so that each of the coil pieces envelopes the stator tooth portion 24 of the stator core 20. The stacked style stator coil assembly 40I' is made up with the stator coil pieces 40W shown in FIG. 15 which have undergone bending and stacked on one another.

In this case, for convenience of the explanation, the stacked style stator coil assembly 40I' is composed of two pieces of end stator coil pieces 40E'1 and 40E'2, one piece of middle coil piece 40L'1, and two pieces of intermediate coil pieces 40S'1 and 40S'2, stacked on one another. Furthermore, although in the state shown in FIGS. 17 and 18 there are gaps between each of the stator coil pieces 40E'1, 40E'2, 40L'1, 40S'1, and 40S'2, these coil pieces are stacked so that they are actually contacted to one another.

As shown in the figure, the middle coil piece 40L'1 is stacked so as to be enveloped between the two intermediate coil pieces 40S'1 and 40S'2. Further, the end stator coil pieces 40E'1 and 40E'2 are stacked on both the end sides of the assembly. In this case, the end portions opposite to the U-shaped side of the intermediate coil piece 40S'1 are denoted as 40S'1-1 and 40S'1-2, respectively. The end portions opposite the U-shaped side of the intermediate coil piece 40S'2 are denoted as 40S'2-1 and 40S'2-2, respectively. Further, the end portions opposite the U-shaped side of the middle coil piece 40L'1 are denoted as 40L'1-1 and 40L'1-2, respectively. Furthermore, similarly as shown in FIG. 6C, the end coil piece 40E'1 has a longer-side end portion and a shorter-side end portion at the opposite side of the U-shaped end. Then, the longer-side end portion is denoted as 40E'1-L while the shorter-side end portion is denoted as 40E'1-S. Also, the longer-side end portion opposite the side of the U-shaped end of the end coil piece 40E'2 is denoted as 40E'2-L while the shorter-side end portion of the same is denoted as 40E'2-S.

As described with reference to FIGS. 6A and 6B, the middle coil piece 40L' is longer than the intermediate coil piece 40S'. Therefore, as shown in FIG. 18, one end portion 40L'1-1 of the middle coil piece 40L'1 is bent toward the end portion 40S'1-2 of the intermediate coil piece 40S'1 so that both of the end portions are brought into contact with each other. Also, the other end portion 40L'1-2 of the middle coil piece 40L'1 is bent toward the end portion 40S'2-1 of the intermediate coil piece 40S'2 so that both of the end portions are brought into contact with each other.

Further, as described with reference to FIGS. 6B and 6C, the length of the end portion of the shorter side of the end coil piece 40E'1 is equal to the length L2 of the middle coil piece 40L'1. Thus, the end portion 40E'1-S of the shorter side of the end coil piece 40E'1 is bent toward the end portion 40S'1-1 of the intermediate coil piece 40S'1 so that both of the end portions are brought into contact with each other. Also, the other end portion 40E'2-S of the shorter side of the end coil piece 40E'2 is bent toward the end portion 40S'2-2 of the intermediate coil piece 40S'2 so that both of the end portions are brought into contact with each other.

In this way, the end portion 40L'1-1 and the end portion 40S'1-2 are connected to each other by welding or the like. Similarly, the end portion 40L'1-2 and the end portion 40S'2-1, the end portion 40E'1-S and the end portion 40S'1-1, the end portion 40E'2-S and the end portion 40S'2-2 are connected to each other by welding or the like.

According to the present embodiment, unlike the example shown in FIGS. 8 and 9, each of the stator coil pieces 40W constituting the stacked stator coil 40I' undergoes bending. Furthermore, if the bending amount is made equal to the thickness of the stator coil piece 40W, for example, the end portion 40E'1-S can be brought into contact with the end portion 40S'1-1 by bending at a right angle. That is, unlike the example shown in FIG. 9, it becomes unnecessary for the end portion 40E1-S to be bent in an oblique direction toward the adjacent stator coil piece, with the result that the bending work can be carried out with ease. In other words, the ends of the respective coil pieces which are connected are bent straight such that connection is effected to an adjacent end lying on the same plane.

Hence, the present invention provides a coil assembly comprising at least two end coil pieces having a U-shaped end and an open end, the open end comprising a first end and a second end, the second end having a terminal length greater than the first end. Further the invention provides at least one middle coil piece stacked between the end coil pieces having a U-shaped end and an open end, the open end comprising third ends having a terminal length equal to the first end. Also, at least two intermediate coil pieces are provided each being separately stacked between the end coil piece and the middle coil piece having a U-shaped end and an open end, the open end comprising fourth ends having a terminal length shorter than the first and third ends wherein the ends of each of the respective coil pieces lie on a different plane with respect to each other and the first and third ends being connected to an adjacent fourth end lying on the same plane.

Figure 19:
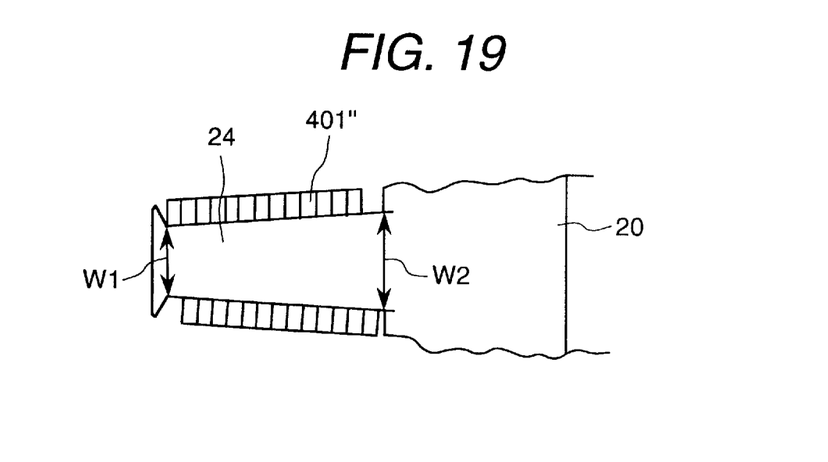
FIG. 19 illustrates a stator according to another embodiment of the present invention.

FIG. 19 illustrates a stator according to another embodiment of the present invention. According to the present embodiment, the stator iron core tooth portion 24 of the stator iron core 20 is formed so that, if W1 is taken as the width of the core center side (inner side) and W2 is taken as the width of the core outer side, the width W2>width W1. That is, the stator iron core tooth portion 24 is formed so as to have a larger width at the portion near the outer diameter and a smaller width at the portion near the inner diameter of the core. In other words, the tooth portion has a width greater at an inner periphery of the core.

A stator coil assembly 40I'' having coil pieces stacked on one another is inserted into the stator slots so that the straight portions envelopes the stator iron core tooth portion 24. The stator coil assembly 40I'' formed of the coil pieces stacked on one another are formed into a U-shape as shown in FIG. 5 or 15. Since the width of the stator iron core tooth portion 24 has the widths which are different from each other at the inner side and the outer side thereof, the distance between the straight portions of the U-shaped coil piece is also variably determined depending on the width of the stator iron core tooth portion.

Figure 20:
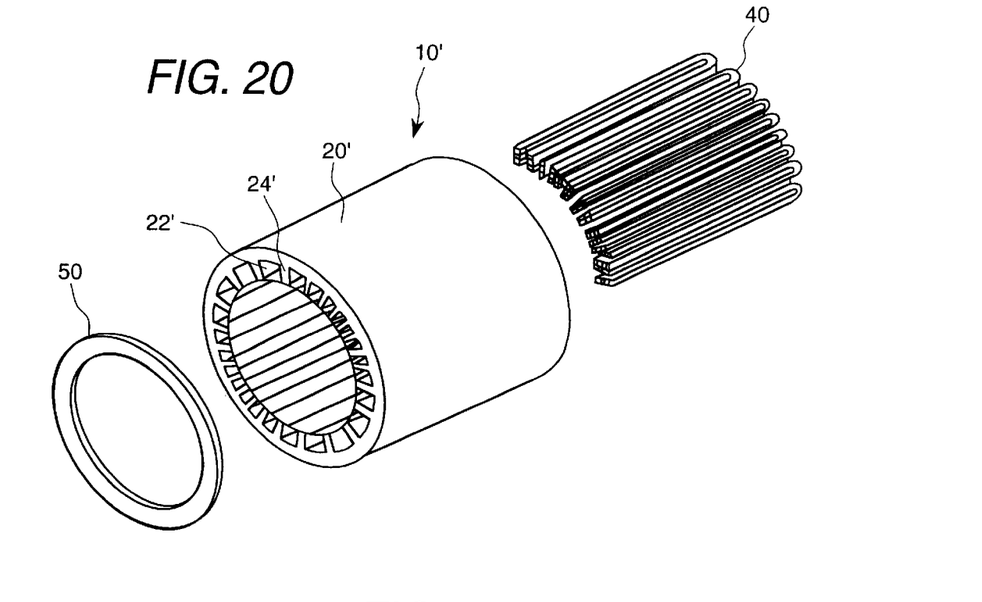
FIG. 20 illustrates the stator of another embodiment of the present invention.

FIG. 20 illustrates the stator of another embodiment of the present invention. The stator 10' is composed of a stator iron core 20', the coil assembly 40, and the connecting ring 50. As described with reference to FIGS. 2 and 4, the coil assembly 40 is formed of stacked coil pieces each made of a wire formed into a U-shaped shape. The coil assembly is inserted into slots 22' provided in the stator iron core 20' from the right side of the figure.

The stator iron core 20' has a plurality of tooth portions 24' each extending from the annular shape core back portion to the internal direction thereof. A slot 22' is formed between a pair of tooth portions 24' adjacent to each other. In this case, the slot 22' has a shape different from that of the slot 22 shown in FIG. 2. That is, while the slot 22 shown in FIG. 2 is made to extend in parallel with the axial direction of the stator iron core 20, the slot 22' is formed into a shape skewed in the axial direction. In other words, the slot in the entry side lies on a different axial plane from the slot in the exit side. The stator iron core 20' is formed in such a manner that a thin plate member is punched so as to form the core back portion and the tooth portions together and then the thin plate members are stacked on one another. The slot 22' having the skewed shape can be formed in such a manner that when the thin plates are stacked on one another, they are slightly shifted relative to one another. The stacked style coil assembly 40' is inserted into the slot 22', the coil assembly 40' also is skewed so as to conform with the skewed shape of the slot 22'. At this time, the stacked style coil assembly may be formed into a skewed shape adaptable to the skewed shape of the slot in advance, and inserted into the slot in the axial direction. In other words, the coil assembly is pre-formed to fit the slot.

The end portions opposite the U-shaped side of the coil assembly 40 are bent so that the adjacent end portions of the wire are connected to each other. Thus, the coil assembly becomes a coil shape having a desired number of windings. Also, both of the end portions of the coil assembly formed into the winding shape are connected by means of the connecting coil 50. Thus, the three-phase terminals (U-phase, V-phase, W-phase) are coupled to one another in a Y-connection manner.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A coil assembly comprising:
   at least two end coil pieces having a U-shaped end and an open end, said open end comprising a first end and a second end, said second end having a terminal length greater than said first end;
   at least one middle coil piece stacked between said end coil pieces having said U-shaped end and said open end, said open end comprising third ends having a terminal length equal to said first end;
   at least two intermediate coil pieces each being separately stacked between said end coil piece and said intermediate coil piece having said U-shaped end and said open end, said open end comprising fourth ends having a terminal length shorter than said first and third ends; and
   said first and third ends being connected to an adjacent said fourth ends.

2. The coil assembly of claim 1 wherein said ends of each of the respective said coil pieces lie on a different plane with respect to each other.

3. The coil assembly of claim 2 wherein said first and third ends are connected to an adjacent said fourth ends lying on the same said plane.

4. The coil assembly of claim 1 wherein said assembly is integrated into a stator.

5. The coil assembly of claim 1 wherein said second end is connected to a connection ring.

6. A stator comprising:
   a core having an entry side and an exit side;
   a tooth portion having two contact sides provided in an inner periphery of said core;
   a slot provided in each of said contact sides;
   a coil assembly provided in said slot;
   said coil assembly further comprising:
      at least two end coil pieces having a U-shaped end and an open end, said open end comprising a first end and a second end, said second end having a terminal length greater than said first end;
      at least one middle coil piece stacked between said end coil pieces having said U-shaped end and said open end, said open end comprising third ends having a terminal length equal to said first end;
      at least two intermediate coil pieces each being separately stacked between said end coil piece and said middle coil piece having said U-shaped end and said open end, said open end comprising fourth ends having a terminal length shorter than said first and third ends; and
      said first and third ends being connected to an adjacent said fourth ends.

7. The stator of claim 6 wherein said ends of each of the respective said coil pieces lie on a different plane with respect to each other.

8. The stator of claim 7 wherein said first and third ends are connected to an adjacent said fourth ends lying on the same said plane.

9. The stator of claim 6 wherein said tooth portion has a width greater at said inner periphery of said core.

10. The stator of claim 6 wherein said slot in said entry side lies on a different axial plane from said slot in said exit side.

11. The stator of claim 10 wherein said coil assembly is preformed to fit said slot.

12. The stator of claim 6 wherein said second end is connected to a connection ring.

* * * * *